No. 693,124.  
E. W. FORNEY.  
COPY HOLDING DEVICE FOR TYPE WRITERS.  
(Application filed Jan. 24, 1901.)
Patented Feb. 11, 1902.
(No Model.)  
2 Sheets—Sheet 1.
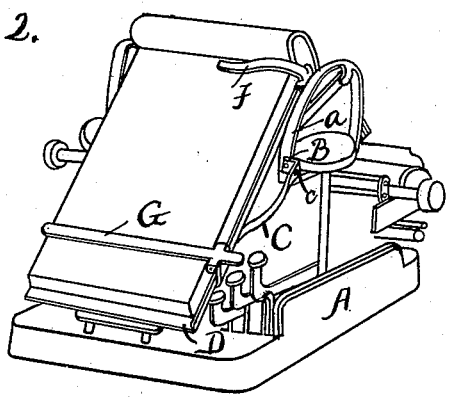
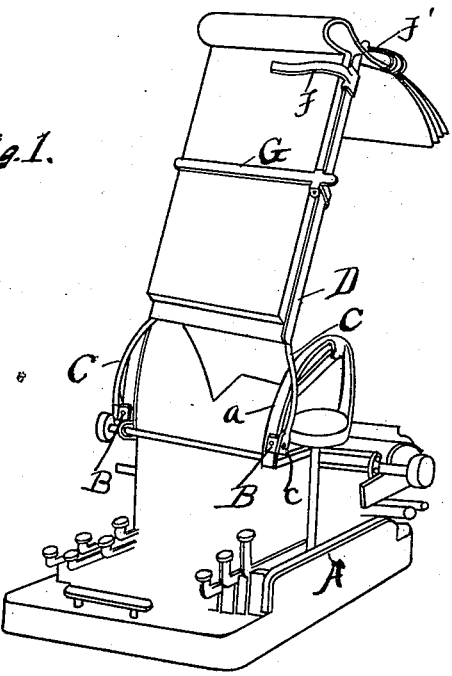

No. 693,124. Patented Feb. 11, 1902.
E. W. FORNEY.
COPY HOLDING DEVICE FOR TYPE WRITERS.
(Application filed Jan. 24, 1901.)
(No Model.) 2 Sheets—Sheet 2.
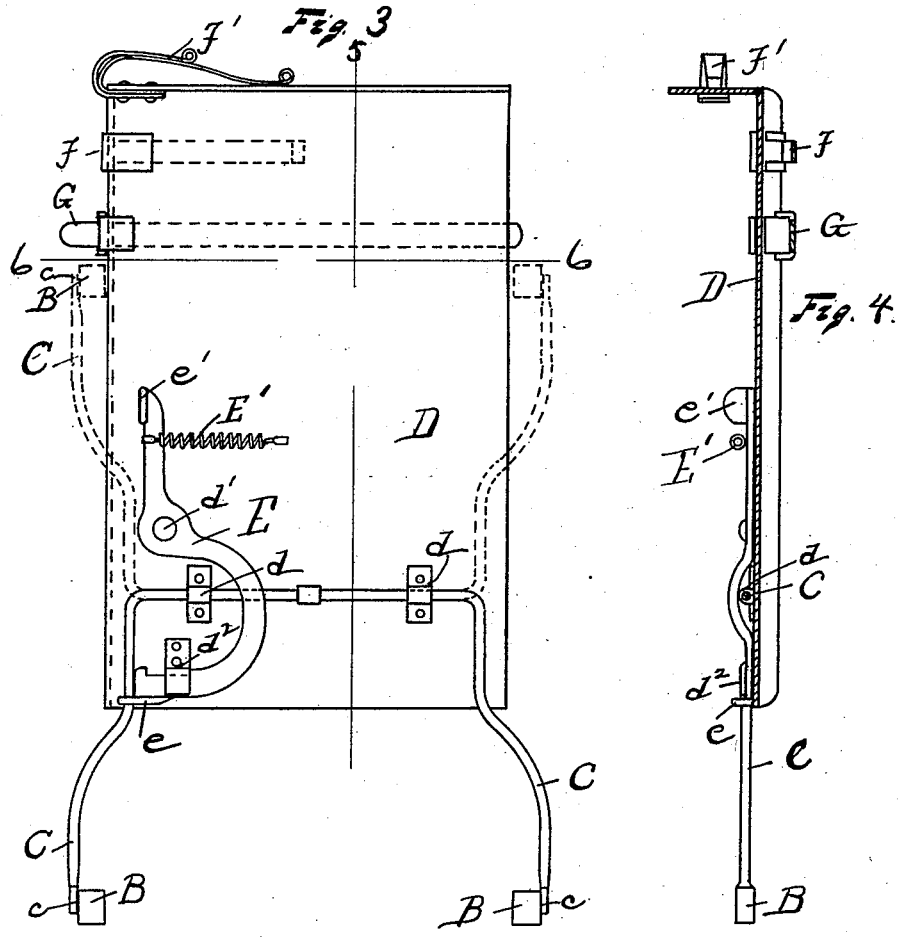
Witnesses
R. F. Lanza
R. Conrader
Inventor
Elwood W. Forney
by H. C. Lord.
Atty.
THE NORRIS PETERS CO., PHOTO-LITHO., WASHINGTON, D. C.

United States Patent Office.

ELWOOD WICKS FORNEY, OF GALENA, KANSAS, ASSIGNOR OF ONE-HALF TO LOUIS K. MOELLER AND WILLIAM L. CROCKETT, OF GALENA, KANSAS.

COPY-HOLDING DEVICE FOR TYPE-WRITERS.

SPECIFICATION forming part of Letters Patent No. 693,124, dated February 11, 1902.

Application filed January 24, 1901. Serial No. 44,627. (No model.)

*To all whom it may concern:*

Be it known that I, ELWOOD WICKS FORNEY, residing at Galena, in the county of Cherokee and State of Kansas, have invented certain new and useful Improvements in Copy-Holding Devices for Type-Writers; and I do hereby declare the following to be a full, clear, and exact description of the invention, such as will enable others skilled in the art to which it appertains to make and use the same.

This invention relates to copy-holding devices for type-writers; and it consists in certain improvements in the construction thereof, as will be hereinafter fully described, and pointed out in the claims.

The object of the invention is to provide a copy-holder which when in use is immediately in front of the operator and when not in use may be folded down without detaching it from the machine to a position which will allow the ordinary covers for said machines to be put in place.

The invention is illustrated in the accompanying drawings, as follows:

Figure 1 shows a copy-holder in position for use. Fig. 2 shows the copy-holder folded down in position to allow the machine to be covered. Fig. 3 shows a back view of the copy-holder detached. Fig. 4 shows a section on the line 5 5 in Fig. 3. Fig. 5 shows a section on the line 6 6 in Fig. 3.

A marks the type-writer frame; $a$, an upper part of said frame. In the construction shown this is the rest-bar for the type-bars in an Oliver type-writer. It will readily be understood that the device may be attached to similar bars or parts of other machines. A block $b$ is fixed on the bar $a$, and to this is hinged at $c$ a bail C. The bail C passes through the loops $d\ d$ on the back of the copy-tablet D. When in use, the bail is in the upright position shown in Fig. 1. This holds the copy above the machine, so that the operator has a view below the copy-holder of the work in the machine. A catch-lever E is pivoted at $d'$ on the back of the tablet D and is provided with the hook-lever $e$, which engages the bail C and locks the tablet with the bail. A guide $d^2$ passes over the catch-lever E, so as to hold it in place on the tablet D. A spring E' holds the catch-lever in position, so as to have the catch engage the bail. The free end of the lever is provided with a thumb-piece $e'$, by means of which the lever may be easily pressed out of engagement.

The operation of the device is readily apparent. When the device is in use, it is brought to the position shown in Fig. 1. The catch $e$ is made to engage the bail, so as to lock the tablet B with the bail. The bail rests against the bar $a$, and thus holds the tablet in its upright position. When it is desired to cover the machine, the catch-lever E is moved so as to bring the catch away from the bail. This allows the bail to turn under the loop $d$ and on the pivot $c$, so that the tablet may be laid upon the front of the machine. In this position it is entirely out of the way of any of the usual covers. The tablet is provided with the usual clips F and F' and the ordinary indicating device G.

The indicating device G is secured to the plate D, as clearly shown in Fig. 6, by bending a piece of metal around a flange at the end of the plate D. The indicator is pivoted on this bent piece. The bent piece is so arranged as to have a frictional hold on the plate D, but still is able to be moved upon it, so as to change the position of the indicator G.

What I claim as new is—

1. In a copy-holding device, for type-writers, the combination of a tablet; an arm or bail hinged on said tablet with a horizontal pivot; an attaching means for attaching said device to a type-writer; a hinge between said attaching means and said arm or bail, said hinge being in a horizontal plane when attached to a type-writer; and means for locking the device in an upright position.

2. In a copy-holding device for type-writers, the combination of a tablet; a bail hinged on said tablet; a catch for engaging said bail and locking it with said tablet; an attaching means for attaching the said device to the type-writer; and a hinge between said attaching means and said bail.

3. In a copy-holding device for typewriters, the combination of the tablet, D; the bail, C, hinged on said tablet; a catch-lever, E, having the hook-lever, *e*, for engaging said bail; attaching-blocks, B; and a hinged connection between said attaching-blocks and said bail.

In testimony whereof I affix my signature in presence of two witnesses.

ELWOOD WICKS FORNEY.

Witnesses:
A. D. SCHREINER,
B. W. GRANT.